April 28, 1925.
E. H. ALDEBORGH
1,535,641
GAUGE
Filed Jan. 15, 1924
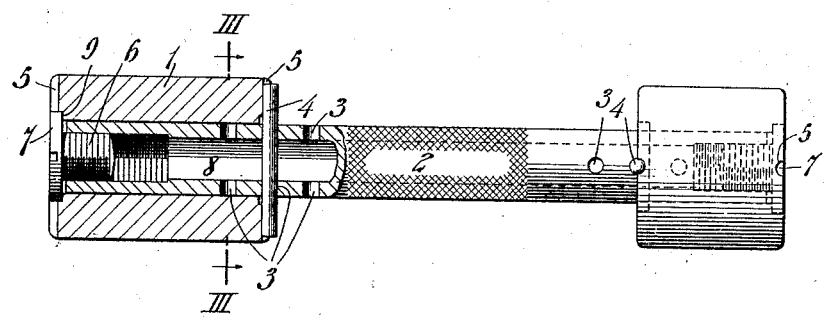
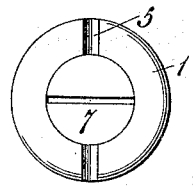
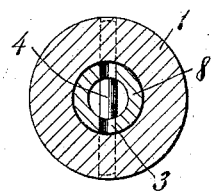
INVENTOR
Erik H Aldeborgh
BY
ATTORNEYS Patented Apr. 28, 1925.

1,535,641

UNITED STATES PATENT OFFICE.

ERIK H. ALDEBORGH, OF POUGHKEEPSIE, NEW YORK, ASSIGNOR TO C. E. JOHANSSON, INC., OF POUGHKEEPSIE, NEW YORK, A CORPORATION OF DELAWARE.

GAUGE.

Application filed January 15, 1924. Serial No. 686,326.

*To all whom it may concern:*

Be it known that I, ERIK H. ALDEBORGH, a subject of the King of Sweden, and resident of Poughkeepsie, in the county of Dutchess and State of New York, have invented a new and useful Improvement in Gauges, of which the following is a specification.

The object of my invention is to provide a plug gauge which will be capable of handling gauge plugs of different predetermined lengths as well as diameters and which will be effective, durable and inexpensive to manufacture.

A practical embodiment of my invention is represented in the accompanying drawing, in which—

Fig. 1 represents the plug gauge partly in side elevation and partly in longitudinal central section.

Fig. 2 represents an end view of the gauge.

Fig. 3 represents a transverse section taken in the plane of the line III—III of Fig. 1, looking in the direction of the arrows.

The tubular gauge plug is denoted by 1 and it may be of any predetermined length and diameter. It is arranged to be removably mounted on either end of the tubular handle 2, with an easy sliding fit. To provide for gauge plugs of different predetermined lengths, the tubular handle has a series of transverse holes 3, arranged at different predetermined distances at each end of the handle in position to receive a cross-pin 4 with a snug fit, the ends of which cross-pin overlap the inner end of the gauge plug and act as an adjustable stop for limiting the inward movement of the gauge plug along the handle.

The gauge plugs are made reversible so that they may be inserted either end first on to either end of the handle. Each end of the plug is provided with a transverse recess 5 for receiving the stop pin, thereby interlocking the plug and handle to prevent the rotation of the plug on the handle.

To securely hold the gauge plug in position on the handle, a screw is provided, the shank 6 of which is screw-threaded into the bore 8 at the end of the handle and the head 7 of which screw bears against the outer end of the gauge plug.

To prevent the head of the screw from projecting beyond the outer end of the gauge plug, the gauge plug is provided at each end with an annular recess 9 for receiving and housing the head of the screw.

From the above description it will be seen that not only gauge plugs of different diameters but also gauge plugs of different predetermined lengths may be secured in position on the handle at one or both ends thereof, in a very simple and effective manner. It will also be seen that by the interlocked engagement between the gauge plug and adjustable stop pin, the gauge plug is held against rotation on the handle. The loose sliding fit between the plug and the handle provides for the expansion and contraction of the metal under different temperature conditions and thereby eliminates the sticking and difficulty of assembling and disassembling the parts.

It is evident that various changes may be resorted to in the form, construction and arrangement of the several parts without departing from the spirit and scope of my invention; hence, I do not wish to be limited to the particular embodiment herein shown and described, but—

What I claim is:—

1. In a plug gauge, a handle, a gauge plug loosely fitted thereon and means for removably holding the plug in position, said means comprising a cross-pin passing through the handle and overlapping the inner end of the plug, and a screw engaging the outer end of the plug.

2. In a plug gauge, a handle, a gauge plug loosely fitted thereon and means for removably holding the plug in position, said means comprising a cross-pin passing through the handle and overlapping the inner end of the plug, and a screw engaging the outer end of the plug, and means whereby the pin may be adjustably positioned along the handle to accommodate plugs of different predetermined lengths.

3. In a plug gauge, a handle, a gauge plug loosely fitted thereon and means for removably holding the plug in position, said means comprising a cross-pin passing through the handle and overlapping the inner end of the plug, and a screw engaging the outer end of the plug, said handle having a series of transverse holes at different positions for receiving the cross-pin to accommodate plugs of different predetermined lengths.

4. In a plug gauge, a handle, a gauge plug loosely fitted thereon and means for removably holding the plug in position, said means comprising a cross-pin passing through the handle and overlapping the inner end of the plug, and a screw engaging the outer end of the plug, said plug having a recess across its end for receiving the cross-pin to interlock the plug and pin.

5. In a plug gauge, a handle, a gauge plug loosely fitted thereon and means for removably holding the plug in position, said means comprising a cross-pin passing through the handle and overlapping the inner end of the plug, and a screw engaging the outer end of the plug, said plug having recesses across its ends, either one for receiving the cross-pin to interlock the plug and pin.

6. In a plug gauge, a handle, a gauge plug loosely fitted thereon and means for removably holding the plug in position, said means comprising a cross-pin passing through the handle and overlapping the inner end of the plug, and a screw engaging the outer end of the plug, the head of said screw being countersunk in the outer end of said plug.

7. In a plug gauge, a handle, a gauge plug loosely fitted thereon and means for removably holding the plug in position, said means comprising a cross-pin passing through the handle and overlapping the inner end of the plug, and a screw engaging the outer end of the plug, the said plug having annular end recesses, either one for receiving and housing the head of the fastening screw.

8. In a plug gauge, a handle, a gauge plug loosely fitted thereon and means for removably holding the plug in position, said means comprising a cross-pin passing through the handle and overlapping the inner end of the plug, and a screw engaging the outer end of the plug, the bore of the handle being screw-threaded at its end for engaging the shank of the screw.

9. In a plug gauge, a handle, a gauge plug loosely fitted thereon and means for removably holding the plug in position, said means comprising a cross-pin passing through the handle and overlapping the inner end of the plug, and a screw engaging the outer end of the plug, the bore of the handle at each end being screw-threaded, each for engaging the shank of the screw.

In testimony, that I claim the foregoing as my invention, I have signed my name this 28th day of November, 1923.

ERIK H. ALDEBORGH.

Witness:
E. L. DAVIS.